US008896367B1

(12) United States Patent
Lin

(10) Patent No.: US 8,896,367 B1
(45) Date of Patent: Nov. 25, 2014

(54) CHARGE PUMP SYSTEM

(71) Applicant: eMemory Technology Inc., Hsin-Chu (TW)

(72) Inventor: Chun-Fu Lin, Taipei (TW)

(73) Assignee: eMemory Technology Inc., Hsin-Chu (TW)

( * ) Notice: Subject to any disclaimer, the term of this patent is extended or adjusted under 35 U.S.C. 154(b) by 0 days.

(21) Appl. No.: 13/944,978

(22) Filed: Jul. 18, 2013

(51) Int. Cl.
 *H02M 3/07* (2006.01)
(52) U.S. Cl.
 CPC .................................... *H02M 3/07* (2013.01)
 USPC ............................................ 327/536; 363/60
(58) Field of Classification Search
 USPC .......................................................... 327/536
 See application file for complete search history.

(56) References Cited

U.S. PATENT DOCUMENTS

| | | | |
|---|---|---|---|
| 5,644,534 A | 7/1997 | Soejima | |
| 5,767,735 A | 6/1998 | Javanifard et al. | |
| 5,969,988 A * | 10/1999 | Tanzawa et al. | 365/185.23 |
| 5,999,040 A * | 12/1999 | Do et al. | 327/536 |
| 6,297,687 B1 * | 10/2001 | Sugimura | 327/536 |
| 6,329,869 B1 * | 12/2001 | Matano | 327/536 |
| 6,472,926 B2 * | 10/2002 | Taito et al. | 327/536 |
| 6,980,045 B1 * | 12/2005 | Liu | 327/536 |
| 7,123,077 B2 * | 10/2006 | Chiu et al. | 327/536 |
| 7,633,331 B2 * | 12/2009 | Jurasek et al. | 327/536 |
| 7,633,824 B2 | 12/2009 | Kato | |
| 8,269,708 B2 * | 9/2012 | Tahata | 345/98 |
| 2006/0114053 A1 * | 6/2006 | Sohara et al. | 327/536 |
| 2009/0278591 A1 * | 11/2009 | Pyeon et al. | 327/536 |
| 2010/0308901 A1 | 12/2010 | Im | |
| 2012/0169405 A1 * | 7/2012 | Choi | 327/536 |
| 2012/0313694 A1 | 12/2012 | Noh et al. | |
| 2014/0022005 A1 * | 1/2014 | Ramanan et al. | 327/536 |

FOREIGN PATENT DOCUMENTS

| | | |
|---|---|---|
| EP | 1298777 A1 | 4/2003 |
| WO | 9960693 A1 | 11/1999 |
| WO | 2006078244 A1 | 7/2006 |

OTHER PUBLICATIONS

European Patent Office, "Search Report", Mar. 7, 2014.

* cited by examiner

*Primary Examiner* — Thomas J Hiltunen
(74) *Attorney, Agent, or Firm* — WPAT, PC; Justin King

(57) ABSTRACT

The charge pump system includes a clock generator, a boosting unit determination device, a charge pump circuit, and a voltage regulator. The clock generator is used for generating a clock group. The boosting unit determination device is used for generating a number control signal. The charge pump circuit is used for receiving an operating voltage, the number control signal and the clock group, and generating an output voltage. The charge pump circuit includes plural boosting units. A first portion of the plural boosting units are controlled by the clock group according to the number control signal. The operating voltage is converted into an output voltage by the first portion of the plural boosting units. The voltage regulator is used for receiving the output voltage and converting the output voltage into a specified regulated voltage.

9 Claims, 15 Drawing Sheets

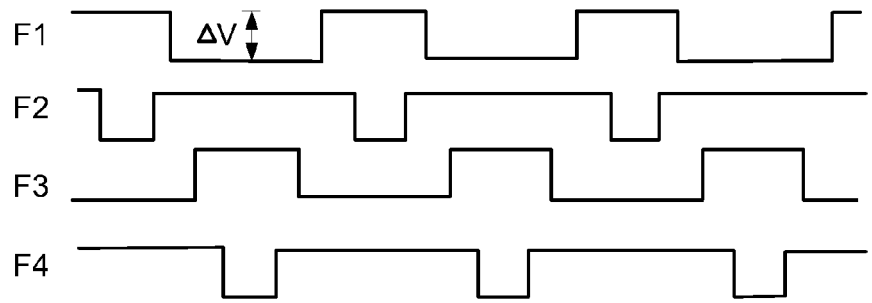
FIG. 10C
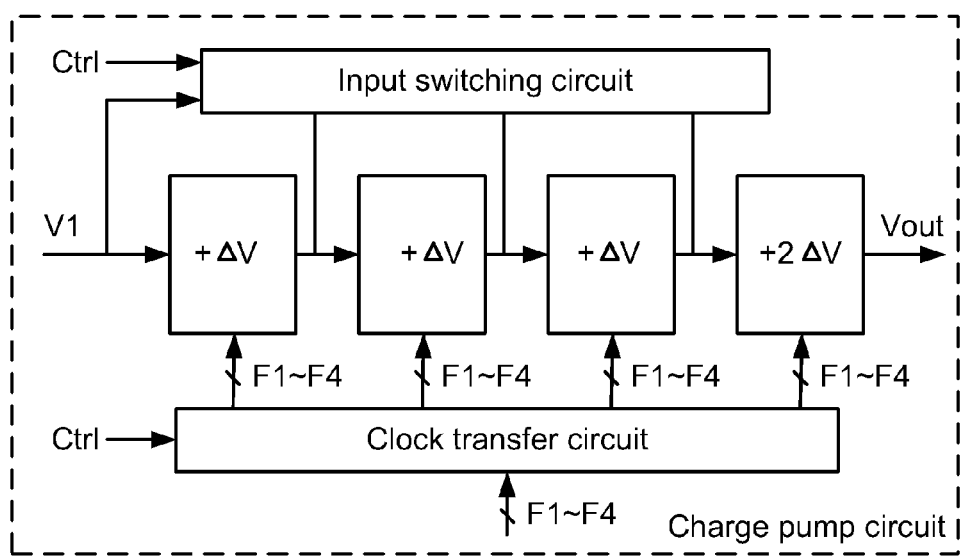
FIG. 10D
| V1 | Ctrl | Vout |
|---|---|---|
| 1.6(V) | 4 | (5+1)x1.6V=9.6(V) |
| 2.0(V) | 3 | (4+1)x2.0V=10.0(V) |
| 2.5(V) | 2 | (3+1)x2.5V=10.0(V) |
| 3.3(V) | 1 | (2+1)x3.3V=9.9(V) |
FIG. 10E

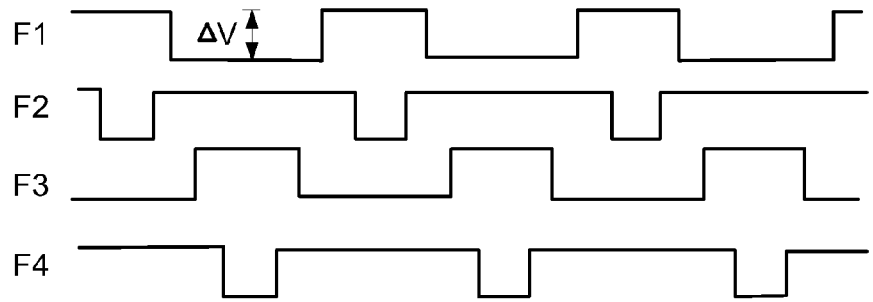
FIG. 11C
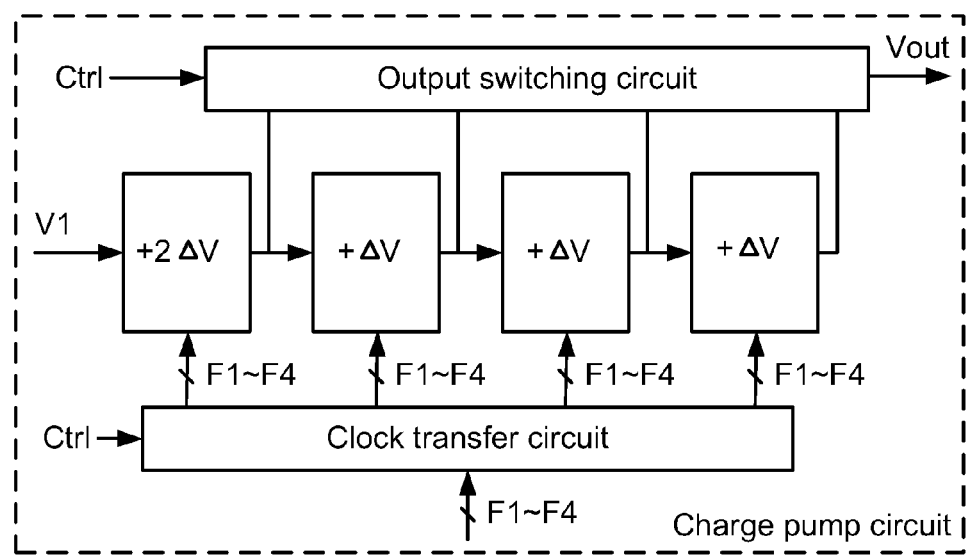
FIG. 11D
| V1 | Ctrl | Vout |
|---|---|---|
| 1.6(V) | 4 | (5+1)x1.6V=9.6(V) |
| 2.0(V) | 3 | (4+1)x2.0V=10.0(V) |
| 2.5(V) | 2 | (3+1)x2.5V=10.0(V) |
| 3.3(V) | 1 | (2+1)x3.3V=9.9(V) |
FIG. 11E

US 8,896,367 B1

CHARGE PUMP SYSTEM

FIELD OF THE INVENTION

The present invention relates to a charge pump system, and more particularly to a charge pump system with dynamically-adjustable number of boosting units.

BACKGROUND OF THE INVENTION

With the increasing development of the semiconductor manufacturing process, the size of the transistor in the integrated circuit is gradually decreased and the operating speed of the integrated circuit is gradually increased. For example, since the operating voltage of the integrated circuit can be reduced to 3.3V or less than 2V, the power consumption can be reduced. However, some kinds of integrated circuits still need high positive voltages or high negative voltages. For example, in a flash memory, a higher positive voltage (e.g. +10V) or a higher negative voltage (e.g. −10V) is used as an erase voltage of the flash memory. Obviously, the positive erase voltage is much higher than the operating voltage, and the negative erase voltage is much lower than the operating voltage. For providing the positive erase voltage or the negative erase voltage, the integrated circuit is usually equipped with a charge pump circuit.

FIG. 1A schematically illustrates a conventional 4-phase charge pump circuit for generating a positive voltage. FIG. 1B is a schematic timing waveform diagram illustrating the clocks for controlling the 4-phase charge pump circuit of FIG. 1A. This 4-phase charge pump circuit is disclosed in U.S. Pat. No. 5,644,534 for example. The 4-phase charge pump circuit is controlled by the clocks F1~F4. Moreover, the 4-phase charge pump circuit comprises four boosting stages 102, 104, 106, 108 and an output stage To. The four boosting stages 102, 104, 106 and 108 have the same structure. The output terminal of each boosting stage is connected with the input terminal of a next boosting stage. The input terminal of the first boosting stage 102 receives an operating voltage Vcc. The output terminal of the fourth boosting stage 108 is connected with the output stage To. Moreover, an output voltage Vout is outputted from the output stage To.

Moreover, each of the four boosting stages 102, 104, 106 and 108 comprises a single boosting circuit. For example, the boosting circuit of the second boosting stage 104 comprises a precharge transistor Tp, a main transistor Tm, and two capacitors Cp, Cm. Both of the precharge transistor Tp and the main transistor Tm are N-type transistors. The drain terminal of the main transistor Tm is served as the input terminal of the second boosting stage 104. The source terminal of the main transistor Tm is served as the output terminal of the second boosting stage 104. The fourth clock F4 is transmitted to the gate terminal of the main transistor Tm through the capacitor Cp in order to control the on/off statuses of the main transistor Tm. The drain terminal of the precharge transistor Tp is connected with the input terminal of the second boosting stage 104. The source terminal of the precharge transistor Tp is connected with the gate terminal of the main transistor Tm. The gate terminal of the precharge transistor Tp is connected with the output terminal of the second boosting stage 104. Moreover, the first clock F1 is transmitted to the output terminal of the second boosting stage 104 through the capacitor Cm.

As shown in FIG. 1B, the amplitude of each of the clocks F1~F4 is equal to Vcc (i.e. the operating voltage). Since the high voltage level of the second clock F2 and the fourth clock F4 are not superimposed with each other, the main transistor of the previous boosting stage and the main transistor of the next boosting stage will not be simultaneously turned on. Hereinafter, the operating principles of the conventional 4-phase charge pump circuit will be illustrated by referring to the clocks F1~F4 of FIG. 1B as well as the second boosting stage 104 and the third boosting stage 106 of FIG. 1A.

Before the time point t1, the fourth clock F4 is at a low-level state. That is, the main transistor Tm of the second boosting stage 104 is turned off. The third clock F3 is at a high-level state. That is, the input terminal of the second boosting stage 104 is pumped to 2Vcc. The first clock F1 is at the low-level state. That is, the output terminal of the second boosting stage 104 is not pumped. Under this circumstance, the voltage at the input terminal of the second boosting stage 104 is higher than the voltage at the output terminal of the second boosting stage 104.

From the time point t1 to the time point t2, the fourth clock F4 is at the high-level state, the third clock F3 is maintained at the high-level state, and the first clock F1 is maintained at the low-level state. That is, the main transistor Tm of the second boosting stage 104 is turned on, and a charging path is created. Under this circumstance, a charging current flows from the input terminal of the second boosting stage 104 to the output terminal of the second boosting stage 104. Consequently, the output terminal of the second boosting stage 104 is charged to 2Vcc theoretically or an elevated level pumped from Vcc as the result of charge sharing between input terminal and output terminal of the second boosting stage 104 practically.

From the time point t2 to the time point t3, the fourth clock F4 is at the low-level state, the third clock F3 is maintained at the high-level state, and the first clock F1 is maintained at the low-level state. That is, the main transistor Tm of the second boosting stage 104 is turned off again. Since the charging path fails to be created, the output terminal of the second boosting stage 104 is maintained at 2Vcc theoretically or the elevated level practically.

At the time point t3, the first clock F1 is switched to the high-level state. That is, the output terminal of the second boosting stage 104 (i.e. the input terminal of the third boosting stage 106) is pumped to 3Vcc or a further boosted level pumped from the previous elevated level. At the time point t4, the third clock F3 is switched to the low-level state. That is, the output terminal of the third boosting stage 106 is not pumped. Under this circumstance, the voltage at the input terminal of the third boosting stage 106 is higher than the voltage at the output terminal of the third boosting stage 106.

From the time point t5 to the time point t6, the second clock F2 is at the high-level state, the first clock F1 is maintained at the high-level state, and the third clock F3 is maintained at the low-level state. That is, the main transistor of the third boosting stage 106 is turned on, and a charging path is created. Under this circumstance, a charging current flows from the input terminal of the third boosting stage 106 to the output terminal of the third boosting stage 106. Consequently, the output terminal of the third boosting stage 106 is charged to 3Vcc theoretically or a second elevated level range pumped from 2Vcc as the result of charge sharing between input terminal and output terminal of the third boosting stage 106 practically.

Since the 4-phase charge pump circuit is controlled by the clocks F1~F4, the output terminal of the first boosting stage 102 is operated between Vcc and 2Vcc, the output terminal of the second boosting stage 104 is operated between 2Vcc and 3Vcc, the output terminal of the third boosting stage 106 is operated between 3Vcc and 4Vcc, and the output terminal of the fourth boosting stage 108 is operated between 4Vcc and 5Vcc.

Moreover, the transistor of the output stage To is also an N-type transistor. The drain terminal and the gate terminal of the output stage To are both connected with the output terminal of the fourth boosting stage 108. Moreover, an output voltage Vout is outputted from the source terminal of the output stage To. Consequently, during the first clock F1 is at the high-level state, the output stage To is turned on to generate the output voltage Vout of 5Vcc.

From the above discussions, the 4-phase charge pump circuit uses four boosting stages to stagewise pump the operating voltage Vcc four times. Consequently, the positive output voltage Vout from the 4-phase charge pump circuit is equal to 5Vcc (i.e. Vcc+4Vcc=5Vcc). In other words, if the 4-phase charge pump circuit comprises N boosting stages, the output voltage Vout is equal to (N+1)×Vcc.

FIG. 2A schematically illustrates a conventional 4-phase dual-branch charge pump circuit for generating a positive voltage. FIG. 2B is a schematic timing waveform diagram illustrating the clocks for controlling the 4-phase dual-branch charge pump circuit of FIG. 2A. The branch from the upper-half operating voltage Vcc to the output voltage Vout denotes a first branch of the 4-phase dual-branch charge pump circuit, and the branch from the lower-half operating voltage Vcc to the output voltage Vout denotes a second branch of the 4-phase dual-branch charge pump circuit. The circuitry of the first branch and the circuitry of the second branch are identical, except the controlling clocks are in the complementary phase of the 4-phase clocking. Moreover, the 4-phase dual-branch charge pump circuit is controlled by the clocks F1~F4.

As shown in FIG. 2A, the 4-phase dual-branch charge pump circuit comprises four boosting stages 202, 204, 206, 208 and an output stage 210. The four boosting stages 202, 204, 206 and 208 have the same structure. Each of the four boosting stages 202, 204, 206 and 208 comprises a first boosting circuit and a second boosting circuit, which have the same structure. The first boosting circuit belongs to the first branch, and the second boosting circuit belongs to the second branch.

In the first branch, the output terminal of the first boosting circuit of each boosting stage is connected with the input terminal of the first boosting circuit of a next boosting stage. The input terminal of the first boosting circuit of the first boosting stage 202 receives the operating voltage Vcc. The output terminal of the first boosting circuit of the fourth boosting stage 208 is connected with the output stage 210. In the second branch, the output terminal of the second boosting circuit of each boosting stage is connected with the input terminal of the second boosting circuit of a next boosting stage. The input terminal of the second boosting circuit of the first boosting stage 202 receives the operating voltage Vcc. The output terminal of the second boosting circuit of the fourth boosting stage 208 is connected with the output stage 210.

For example, the first boosting circuit of the first boosting stage 202 comprises a precharge transistor T2, a main transistor T1, and two capacitors C1, C2. Both of the precharge transistor T1 and the main transistor T2 are N-type transistors. The drain terminal of the main transistor T1 is served as the input terminal of the first boosting circuit of the first boosting stage 202. The source terminal of the main transistor T1 is served as the output terminal of the first boosting circuit of the first boosting stage 202. The second clock F2 is transmitted to the gate terminal of the main transistor T1 through the capacitor C1. The drain terminal of the precharge transistor T2 is connected with the input terminal of the first boosting circuit of the first boosting stage 202. The source terminal of the precharge transistor T2 is connected with the gate terminal of the main transistor T1. The gate terminal of the precharge transistor T2 is connected with the output terminal of the first boosting circuit of the first boosting stage 202. Moreover, the third clock F3 is transmitted to the output terminal of the first boosting circuit of the first boosting stage 202 through the capacitor C2.

The output stage 210 comprises two output circuits, which have the same structure. The first output circuit belongs to the first branch, and the second output circuit belongs to the second branch. The first output circuit comprises a capacitor C9, a transistor T9, and a transistor T10. Both of the transistor T9 and the transistor T10 are N-type transistors. The drain terminal of the transistor T9 is connected with the output terminal M of the first boosting circuit of the fourth boosting stage 208. Moreover, an output voltage Vout is outputted from the source terminal of the transistor T9. The second clock F2 is transmitted to the gate terminal of the transistor T9 through the capacitor C9. The drain terminal of the transistor T10 is also connected with the output terminal M of the first boosting circuit of the fourth boosting stage 208. The source terminal of the transistor T10 is connected with the gate terminal of the transistor T9. The gate terminal of the transistor T10 is connected with the output terminal M' of the second boosting circuit of the fourth boosting stage 208.

The second output circuit comprises a capacitor C9', a transistor T9', and a transistor T10'. The drain terminal of the transistor T9' is connected with the output terminal M' of the second boosting circuit of the fourth boosting stage 208. The source terminal of the transistor T9' is connected with the source terminal of the transistor T9 for outputting the output voltage Vout. The fourth clock F4 is transmitted to the gate terminal of the transistor T9' through the capacitor C9'. The drain terminal of the transistor T10' is also connected with the output terminal M' of the second boosting circuit of the fourth boosting stage 208. The source terminal of the transistor T10' is connected with the gate terminal of the transistor T9'. The gate terminal of the transistor T10' is connected with the output terminal M of the first boosting circuit of the fourth boosting stage 208.

As shown in FIG. 2B, the amplitude of each of the clocks F1~F4 is equal to Vcc (i.e. the operating voltage). Since the high voltage level of the second clock F2 and the fourth clock F4 are not superimposed with each other, the main transistor of the previous first boosting circuit and the main transistor of the next first boosting circuit in the first branch will not be simultaneously turned on. The operating principles of the first branch and the second branch of the 4-phase dual-branch charge pump circuit are similar to the operating principles of the 4-phase charge pump circuit of FIG. 1A, and are not redundantly described.

Since the 4-phase dual-branch charge pump circuit is controlled by the clocks F1~F4, the output terminals of the first boosting circuit and the second boosting circuit of the first boosting stage 202 are operated between Vcc and 2Vcc, the output terminals of the first boosting circuit and the second boosting circuit of the second boosting stage 204 are operated between 2Vcc and 3Vcc, the output terminals of the first boosting circuit and the second boosting circuit of the third boosting stage 206 are operated between 3Vcc and 4Vcc, and the output terminals of the first boosting circuit and the second boosting circuit of the fourth boosting stage 208 are operated between 4Vcc and 5Vcc.

Moreover, during the second clock F2 is at the high-level state, the first output circuit of the output stage 210 may generate the output voltage Vout of 5Vcc. Moreover, during the fourth clock F4 is at the high-level state, the second output circuit of the output stage 210 may generate the output voltage Vout of 5Vcc.

From the above discussions, the 4-phase dual-branch charge pump circuit uses four boosting stages to stagewise pump the operating voltage Vcc four times. If the 4-phase dual-branch charge pump circuit comprises N boosting stages, the output voltage Vout is equal to (N+1)×Vcc. In comparison with the 4-phase charge pump circuit of FIG. 1A, the 4-phase dual-branch charge pump circuit of FIG. 2A has smaller output ripple and potentially higher output efficiency.

Moreover, in case that the N-type transistors of the 4-phase dual-branch charge pump circuit of FIG. 2A are replaced by P-type transistors, another 4-phase dual-branch charge pump circuit for generating a negative voltage is provided. FIG. 3A schematically illustrates a conventional 4-phase dual-branch charge pump circuit for generating a negative voltage. FIG. 3B is a schematic timing waveform diagram illustrating the clocks for controlling the 4-phase dual-branch charge pump circuit of FIG. 3A.

The branch from the upper-half ground voltage to the output voltage Vout denotes a first branch of the 4-phase dual-branch charge pump circuit, and the branch from the lower-half ground voltage to the output voltage Vout denotes a second branch of the 4-phase dual-branch charge pump circuit. The circuitry of the first branch and the circuitry of the second branch are identical. Moreover, the 4-phase dual-branch charge pump circuit is controlled by the clocks F1~F4.

As shown in FIG. 3A, the 4-phase dual-branch charge pump circuit comprises four boosting stages 302, 304, 306, 308 and an output stage 310. Each of the four boosting stages 302, 304, 306 and 308 comprises a first boosting circuit and a second boosting circuit, which have the same structure. The first boosting circuit belongs to the first branch, and the second boosting circuit belongs to the second branch. Hereinafter, the operations of the 4-phase dual-branch charge pump circuit will be illustrated by referring to a single boosting circuit.

According to the first clock F1 and the third clock F3, when the main transistor of the first boosting circuit is turned on, the voltage at the input terminal of the first boosting circuit is lower than the voltage at the output terminal of the first boosting circuit. Consequently, a charging circuit flows from the output terminal to the input terminal. Under this circumstance, the minimum output voltage is outputted from the output terminal of the first boosting circuit of the last boosting stage 308. As shown in FIG. 3A, since the 4-phase dual-branch charge pump circuit uses four boosting stages to stagewise pump the ground voltage (0V) four times, the output stage 310 may generate the output voltage Vout of −4Vcc.

As known, for designing an integrated circuit, the operating voltage Vcc and the output voltage Vout should be firstly realized, and then the number of boosting stages of the charge pump circuit is determined. That is, after the charge pump circuit is designed, the relationship between the operating voltage Vcc and the output voltage Vout is determined and fails to be changed.

Recently, the fabricating process of the integrated circuit is advanced to the deep sub-micron technology. For example, the operating voltage for the circuit system using the 0.13 μm technology may be 1.8V, 2.5V or 3.3V. After the charge pump circuit is designed, the charge pump circuit fails to be applied to the circuit system with various operating voltages.

SUMMARY OF THE INVENTION

The present invention provides a charge pump system. In the charge pump system, the number of boosting units can be determined according to the relationship between the operating voltage and a preset output voltage. Consequently, the charge pump system of the present invention can be applied to various circuit systems at various operating voltages.

An embodiment of the present invention provides a charge pump system. The charge pump system includes a clock generator, a boosting unit determination device, a charge pump circuit, and a voltage regulator. The clock generator is used for generating a clock group. The boosting unit determination device is used for generating a number control signal. The charge pump circuit is used for receiving an operating voltage, the number control signal and the clock group, and generating an output voltage. The charge pump circuit includes plural boosting units. A first portion of the plural boosting units are controlled by the clock group according to the number control signal. The operating voltage is converted into an output voltage by the first portion of the plural boosting units. The voltage regulator is used for receiving the output voltage and converting the output voltage into a specified regulated voltage.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 10C is a schematic timing waveform diagram illustrating the clocks for controlling the boosting unit group of FIG. 10A or FIG. 10B;

FIG. 10D is a schematic circuit block diagram illustrating the increased voltage by the boosting units of the first exemplary charge pump circuit of the FIG. 5;

FIG. 10E is a table showing the relationship between the operating voltage, the number control signal and the output voltage for the charge pump circuit of FIG. 10D;

FIG. 11C is a schematic timing waveform diagram illustrating the clocks for controlling the boosting unit group of FIG. 11A or FIG. 11B;

FIG. 11D is a schematic circuit block diagram illustrating the increased voltage by the boosting units of the second exemplary charge pump circuit of the FIG. 7; and FIG. 11E is a table showing the relationship between the operating voltage, the number control signal and the output voltage for the charge pump circuit of FIG. 11D.

DETAILED DESCRIPTION OF PREFERRED EMBODIMENTS

Figure 4:
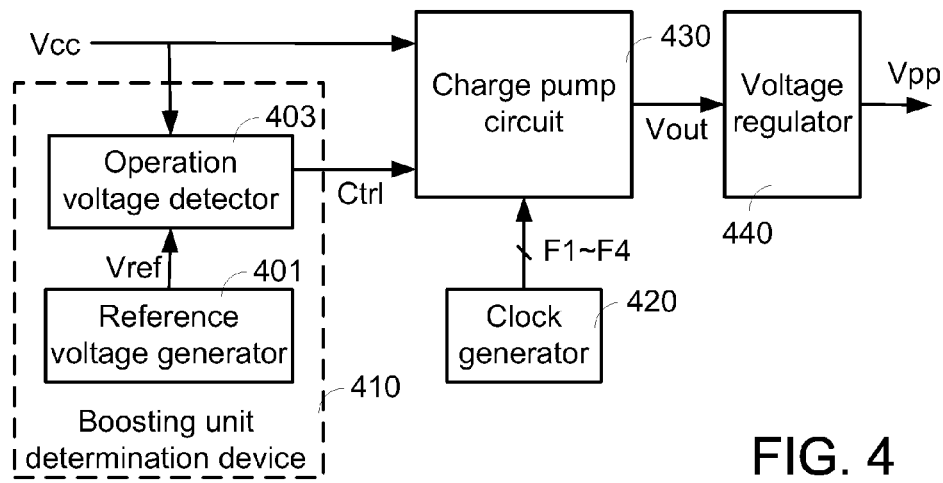
FIG. 4 is a schematic circuit block diagram illustrating a charge pump system according to an embodiment of the present invention.

FIG. 4 is a schematic circuit block diagram illustrating a charge pump system according to an embodiment of the present invention. As shown in FIG. 4, the charge pump system comprises a boosting unit determination device 410, a clock generator 420, a charge pump circuit 430, and a voltage regulator 440. The charge pump circuit 430 is a 4-phase charge pump circuit. The clock generator 420 is used for generating a clock group including the clocks F1~F4.

The boosting unit determination device 410 comprises a reference voltage generator 401 and an operating voltage detector 403. The reference voltage generator 401 is used for generating a reference voltage Vref. In an embodiment, the reference voltage generator 401 is implemented by a bandgap reference circuit. The operating voltage detector 403 receives an operating voltage Vcc and the reference voltage Vref. By comparing the operating voltage Vcc and the reference voltage Vref, the magnitude of the operating voltage Vcc is realized by the operating voltage detector 403. According to the relationship between the operating voltage Vcc and a desired output voltage Vout (also referred as a preset output voltage), the operating voltage detector 403 generates a number control signal Ctrl to the charge pump circuit 430. According to the number control signal Ctrl, a designated number of boosting units are normally operated and controlled by the clocks F1~F4 from the clock generator 420.

After the output voltage Vout is transmitted from the charge pump circuit 430 to the voltage regulator 440, the output voltage Vout is regulated to a more stable regulated voltage Vpp by the voltage regulator 440.

Figure 5:
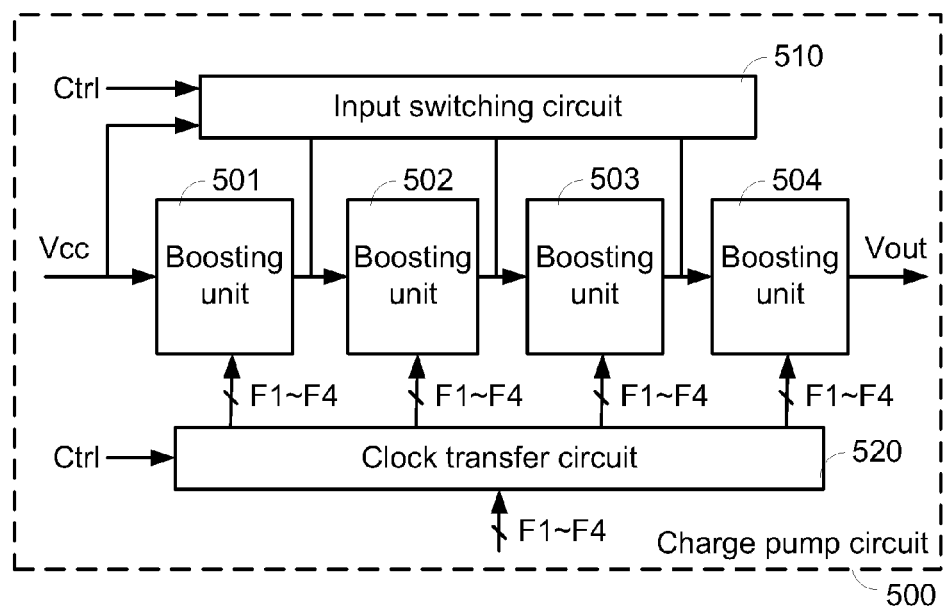
FIG. 5 is a schematic circuit block diagram illustrating a first exemplary charge pump circuit used in the charge pump system of the present invention.

FIG. 5 is a schematic circuit block diagram illustrating a first exemplary charge pump circuit used in the charge pump system of the present invention. As shown in FIG. 5, the charge pump circuit 500 comprises an input switching circuit 510, a clock transfer circuit 520, and plural boosting units 501~504. The plural boosting units 501~504 are sequentially connected with each other in series to be collaboratively defined as a boosting unit group. According to the number control signal Ctrl, the operating voltage Vcc is selectively inputted into the input terminal of a specified boosting unit through the input switching circuit 510. The clock transfer circuit 520 is used for receiving the clocks F1~F4. According to the number control signal Ctrl, the clocks F1~F4 are selectively inputted into corresponding boosting units through the clock transfer circuit 520.

For example, as shown in FIG. 5, the number control signal Ctrl is 4. It means that four boosting units of the charge pump circuit 500 are utilized. Consequently, the clocks F1~F4 are transmitted to the four boosting units 501~504 through the clock transfer circuit 520. Moreover, the operating voltage Vcc is not inputted into the input terminals of the second boosting unit 502, the third boosting unit 503 and the fourth boosting unit 504 through the input switching circuit 510, but the operating voltage Vcc is inputted into the input terminal of the first boosting unit 501. In other words, if the number control signal Ctrl is 4, after the operating voltage Vcc is transmitted through the first boosting unit 501, the second boosting unit 502, the third boosting unit 503 and the fourth boosting unit 504 sequentially, the output voltage Vout is correspondingly generated.

Figure 6A:
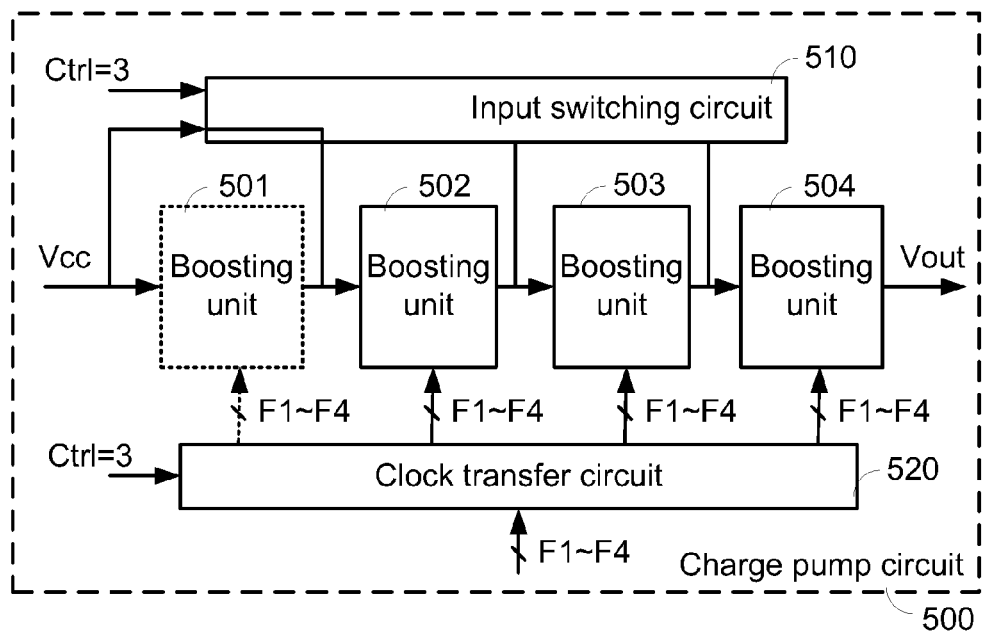
FIGS. 6A, 6B and 6C are schematic circuit block diagrams illustrating the operations of the first exemplary charge pump circuit of FIG. 5 according to different number control signals.
Figure 6B:
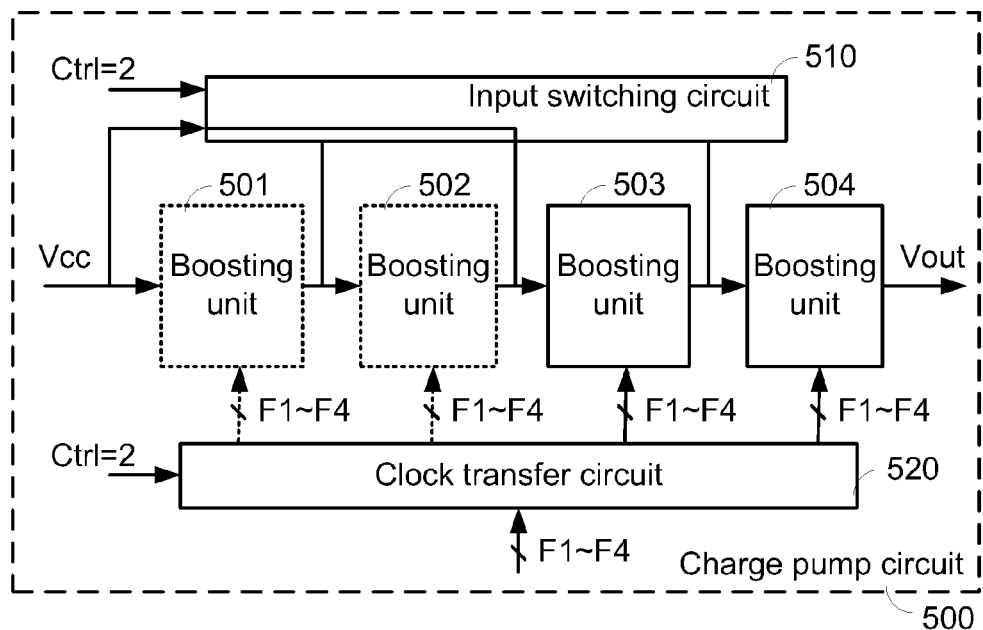
Figure 6C:
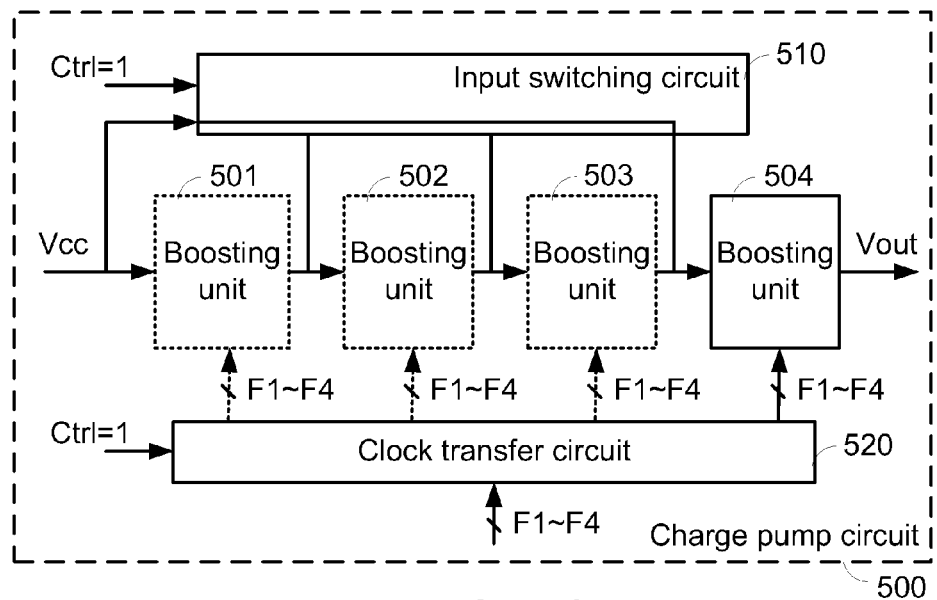

FIGS. 6A, 6B and 6C are schematic circuit block diagrams illustrating the operations of the first exemplary charge pump circuit of FIG. 5 according to different number control signals.

As shown in FIG. 6A, the number control signal Ctrl is 3. It means that three boosting units of the charge pump circuit 500 are utilized. Consequently, the clocks F1~F4 are transmitted to the second boosting unit 502, the third boosting unit 503 and the fourth boosting unit 504 through the clock transfer circuit 520. The first boosting unit 501 is disabled because the clocks F1~F4 are not transmitted to the first boosting unit 501. Since the first boosting unit 501 is disabled, the block of the first boosting unit 501 is indicated by dotted lines. Moreover, according to the number control signal Ctrl, the input terminal for inputting the operating voltage Vcc is switched to the input terminal of the second boosting unit 502 by the input switching circuit 510. Consequently, the operating voltage Vcc is inputted to the input terminal of the second boosting unit 502. In other words, if the number control signal Ctrl is 3, after the operating voltage Vcc is transmitted through the second boosting unit 502, the third boosting unit 503 and the fourth boosting unit 504 sequentially, the output voltage Vout is correspondingly generated.

As shown in FIG. 6B, the number control signal Ctrl is 2. It means that two boosting units of the charge pump circuit 500 are utilized. Consequently, the clocks F1~F4 are transmitted to the third boosting unit 503 and the fourth boosting unit 504 through the clock transfer circuit 520. However, the clocks F1~F4 are not transmitted to the first boosting unit 501 and the second boosting unit 502. Consequently, the first boosting unit 501 and the second boosting unit 502 are disabled. Moreover, according to the number control signal Ctrl, the input terminal for inputting the operating voltage Vcc is switched to the input terminal of the third boosting unit 503 by the input switching circuit 510. Consequently, the operating voltage Vcc is inputted to the input terminal of the third boosting unit 503. In other words, if the number control signal Ctrl is 2, after the operating voltage Vcc is transmitted through the third boosting unit 503 and the fourth boosting unit 504 sequentially, the output voltage Vout is correspondingly generated.

As shown in FIG. 6C, the number control signal Ctrl is 1. It means that one boosting unit of the charge pump circuit 500 are utilized. Consequently, the clocks F1~F4 are transmitted to the fourth boosting unit 504 through the clock transfer circuit 520. However, the clocks F1~F4 are not transmitted to the first boosting unit 501, the second boosting unit 502 and the third boosting unit 503. Consequently, the first boosting unit 501, the second boosting unit 502 and the third boosting unit 503 are disabled. Moreover, according to the number control signal Ctrl, the input terminal for inputting the operating voltage Vcc is switched to the input terminal of the fourth boosting unit 504 by the input switching circuit 510. Consequently, the operating voltage Vcc is inputted to the input terminal of the fourth boosting unit 504. In other words, if the number control signal Ctrl is 1, after the operating voltage Vcc is transmitted through the fourth boosting unit 504 sequentially, the output voltage Vout is correspondingly generated.

Figure 7:
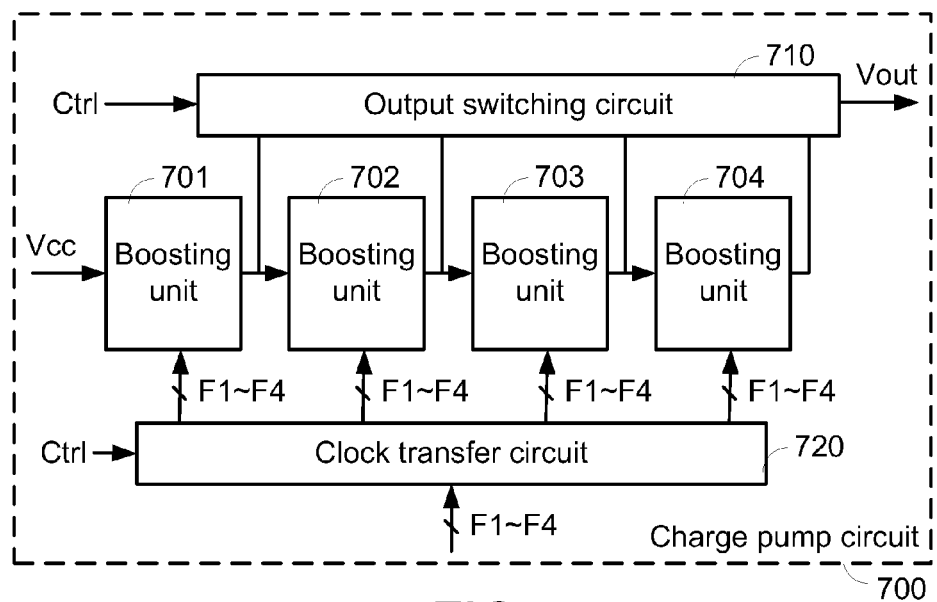
FIG. 7 is a schematic circuit block diagram illustrating a second exemplary charge pump circuit used in the charge pump system of the present invention.

FIG. 7 is a schematic circuit block diagram illustrating a second exemplary charge pump circuit used in the charge pump system of the present invention. As shown in FIG. 7, the charge pump circuit 700 comprises an output switching circuit 710, a clock transfer circuit 720, and plural boosting units 701~704. The plural boosting units 701~704 are sequentially connected with each other in series to define a boosting unit group. According to the number control signal Ctrl, a voltage generated from an output terminal of a specified boosting unit is selectively used as an output voltage Vout through the output switching circuit 710. The clock transfer circuit 720 is used for receiving the clocks F1~F4. According to the number control signal Ctrl, the clocks F1~F4 are selectively inputted into corresponding boosting units through the clock transfer circuit 720.

FIGS. 8A, 8B, 8C and 8D are schematic circuit block diagrams illustrating the operations of the second exemplary charge pump circuit of FIG. 7 according to different number control signals.

Figure 8A:
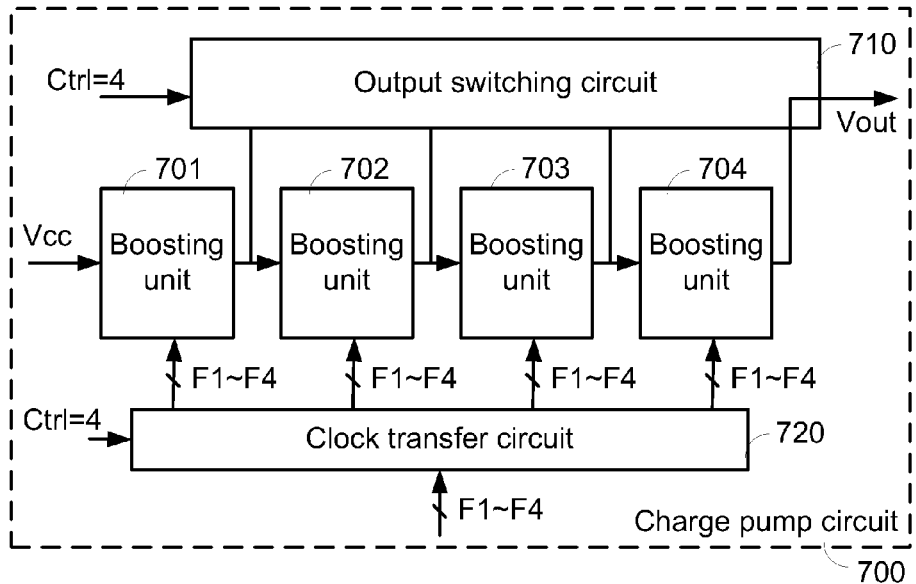
FIGS. 8A, 8B, 8C and 8D are schematic circuit block diagrams illustrating the operations of the second exemplary charge pump circuit of FIG. 7 according to different number control signals.

As shown in FIG. 8A, the number control signal Ctrl is 4. It means that four boosting units of the charge pump circuit 700 are utilized. Consequently, the clocks F1~F4 are transmitted to the four boosting units 701~704 through the clock transfer circuit 720. Moreover, the output voltage Vout is generated by the fourth boosting unit 704 through the output switching circuit 710. In other words, if the number control signal Ctrl is 4, after the operating voltage Vcc is transmitted through the first boosting unit 701, the second boosting unit 702, the third boosting unit 703 and the fourth boosting unit 704 sequentially, the output voltage Vout is correspondingly generated.

Figure 8B:
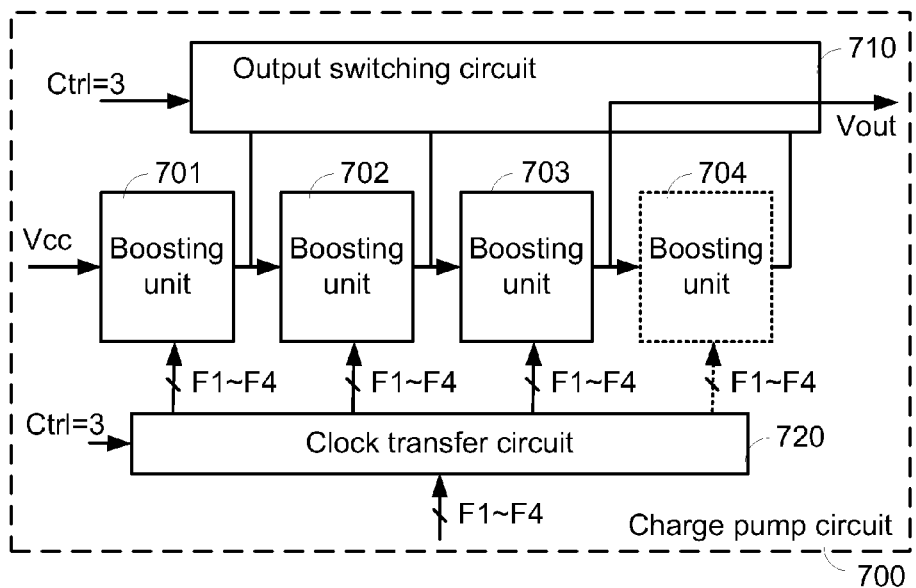

As shown in FIG. 8B, the number control signal Ctrl is 3. It means that three boosting units of the charge pump circuit 700 are utilized. Consequently, the clocks F1~F4 are transmitted to the first boosting unit 701, the second boosting unit 702 and the third boosting unit 703 through the clock transfer circuit 720. However, the clocks F1~F4 are not transmitted to the fourth boosting unit 704. Consequently, the fourth boosting unit 704 is disabled. Moreover, according to the number control signal Ctrl, the output voltage Vout is generated by the third boosting unit 703 through the output switching circuit 710. In other words, if the number control signal Ctrl is 3, after the operating voltage Vcc is transmitted through the first boosting unit 701, the second boosting unit 702 and the third boosting unit 703 sequentially, the output voltage Vout is correspondingly generated.

Figure 8C:
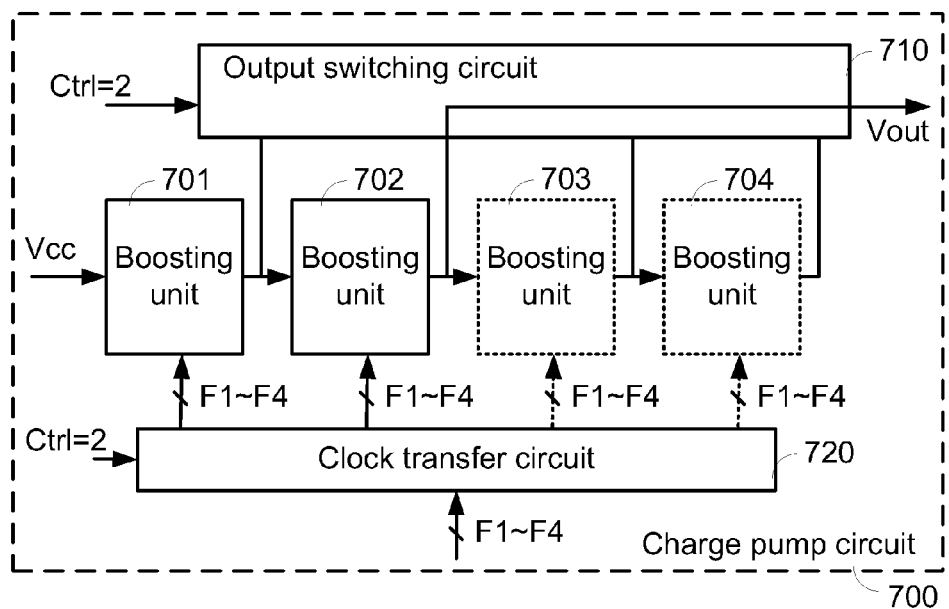

As shown in FIG. 8C, the number control signal Ctrl is 2. It means that two boosting units of the charge pump circuit 700 are utilized. Consequently, the clocks F1~F4 are transmitted to the first boosting unit 701 and the second boosting unit 702 through the clock transfer circuit 720. However, the clocks F1~F4 are not transmitted to the third boosting unit 703 and the fourth boosting unit 704. Consequently, the third boosting unit 703 and the fourth boosting unit 704 are disabled. Moreover, according to the number control signal Ctrl, the output voltage Vout is generated by the second boosting unit 702 through the output switching circuit 710. In other words, if the number control signal Ctrl is 2, after the operating voltage Vcc is transmitted through the first boosting unit 701 and the second boosting unit 702 sequentially, the output voltage Vout is correspondingly generated.

Figure 8D:
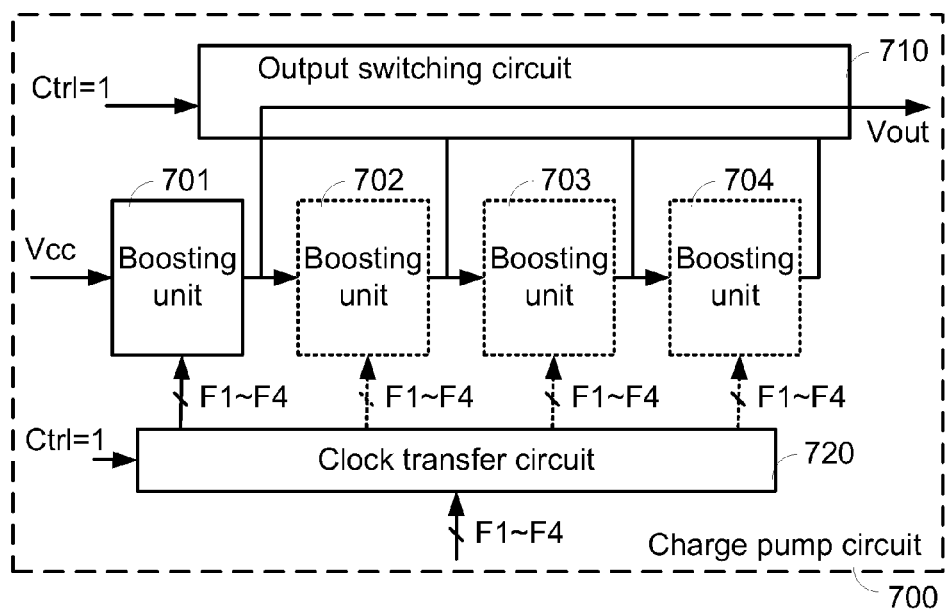

As shown in FIG. 8D, the number control signal Ctrl is 1. It means that one boosting unit of the charge pump circuit 700 is utilized. Consequently, the clocks F1~F4 are transmitted to the first boosting unit 701 through the clock transfer circuit 720. However, the clocks F1~F4 are not transmitted to the second boosting unit 702, the third boosting unit 703 and the fourth boosting unit 704. Consequently, the second boosting unit 702, the third boosting unit 703 and the fourth boosting unit 704 are disabled. Moreover, according to the number control signal Ctrl, the output voltage Vout is generated by the first boosting unit 701 through the output switching circuit 710. In other words, if the number control signal Ctrl is 1, after the operating voltage Vcc is transmitted through the first boosting unit 701, the output voltage Vout is correspondingly generated.

In the above embodiments, four boosting units are included in the charge pump circuits 500 and 700 for illustration. However, the number of the boosting units is not restricted as long as the charge pump circuit includes at least one boosting unit.

Figure 9A:
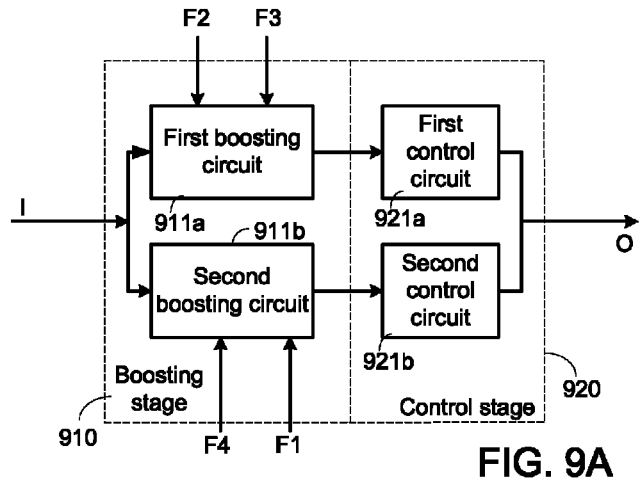
FIG. 9A is a schematic circuit block diagram illustrating an exemplary boosting unit used in the charge pump circuit of the charge pump system of the present invention.

FIG. 9A is a schematic circuit block diagram illustrating an exemplary boosting unit used in the charge pump circuit of the charge pump system of the present invention. As shown in FIG. 9A, the boosting unit comprises a boosting stage 910 and a control stage 920. The boosting stage 910 comprises a first boosting circuit 911a and a second boosting circuit 911b. The first boosting circuit 911a belongs to a first branch, and the second boosting circuit 911b belongs to a second branch. The first branch and the second branch are connected with an input terminal I of the boosting unit. The control stage 920 comprises a first control circuit 921a and a second control circuit 921b. The first control circuit 921a belongs to the first branch, and the second control circuit 921b belongs to the second branch. The input terminals of the first control circuit 921a and the second control circuit 921b are connected with the output terminals of the first boosting circuit 911a and the second boosting circuit 911b of the boosting stage 910, respectively. Moreover, the first branch and the second branch are connected with an output terminal O of the boosting unit through the control stage 920.

The first boosting circuit 911a of the first branch is controlled by the clocks F2 and F3. When the input voltage V1 is received by the input terminal I of the first boosting circuit 911a, a voltage (V1+ΔV) is outputted from the output terminal of the first boosting circuit 911a, and the voltage (V1+ΔV) is outputted from the output terminal O of the first control circuit 921a. The second boosting circuit 911b of the second branch is controlled by the clocks F4 and F1. Consequently, the voltage (V1+ΔV) is outputted from the output terminal O of the second control circuit 921b.

Figure 9B:
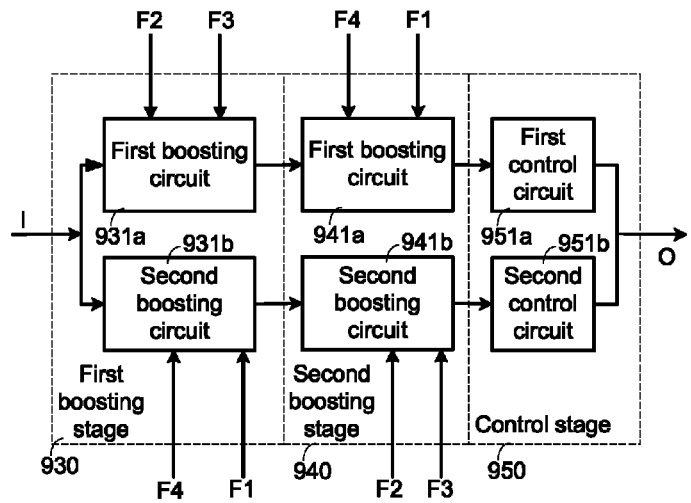
FIG. 9B is a schematic circuit block diagram illustrating another exemplary boosting unit used in the charge pump circuit of the charge pump system of the present invention.

FIG. 9B is a schematic circuit block diagram illustrating another exemplary boosting unit used in the charge pump circuit of the charge pump system of the present invention. As shown in FIG. 9B, the boosting unit comprises a first boosting stage 930, a second boosting stage 940, and a control stage 950. The first boosting stage 930 comprises a first boosting circuit 931a and a second boosting circuit 931b. The first boosting circuit 931a belongs to a first branch, and the second boosting circuit 931b belongs to a second branch. The first branch and the second branch are connected with an input terminal I of the boosting unit. The second boosting stage 940 comprises a first boosting circuit 941a and a second boosting circuit 941b. The first boosting circuit 941a belongs to the first branch, and the second boosting circuit 941b belongs to the second branch. The input terminals of the first boosting circuit 941a and the second boosting circuit 941b are connected with the output terminals of the first boosting circuit 931a and the second boosting circuit 931b, respectively. The control stage 950 comprises a first control circuit 951a and a second control circuit 951b. The first control circuit 951a belongs to the first branch, and the second control circuit 951b belongs to the second branch. The input terminals of the first control circuit 951a and the second control circuit 951b are connected with the output terminals of the first boosting circuit 941a and the second boosting circuit 941b of the second boosting stage 940, respectively. Moreover, the first branch and the second branch are connected with an output terminal O of the boosting unit through the control stage 950.

In the first branch, the first boosting circuit 931a is controlled by the clocks F2 and F3, and the first boosting circuit 941a is controlled by the clocks F4 and F1. When the input voltage V1 is received by the input terminal I of the first boosting circuit 931a, a voltage (V1+ΔV) is outputted from the output terminal of the first boosting circuit 931a, and a voltage (V1+2ΔV) is outputted from the output terminal of the first boosting circuit 941a. Consequently, the voltage (V1+2ΔV) is outputted from the output terminal O of the first control circuit 951a. Similarly, the second branch is controlled by the clocks F1~F4. Consequently, the voltage (V1+2ΔV) is outputted from the output terminal O of the second control circuit 951b.

Figure 1A:
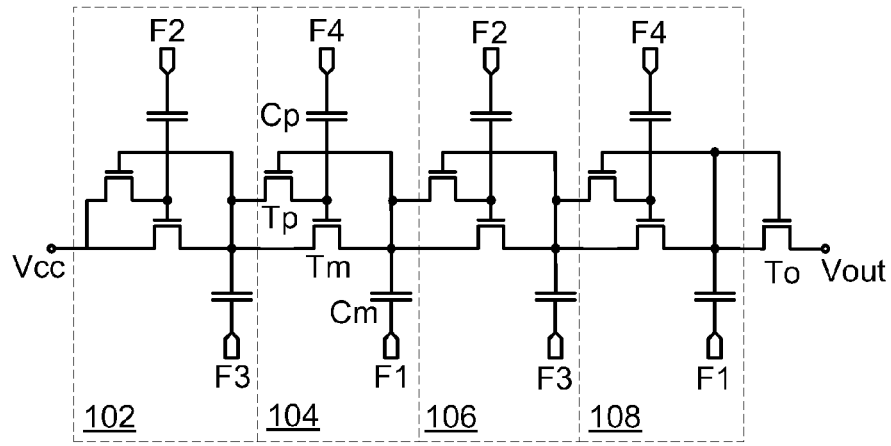
FIG. 1A (prior art) schematically illustrates a conventional 4-phase charge pump circuit for generating a positive voltage.
Figure 1B:
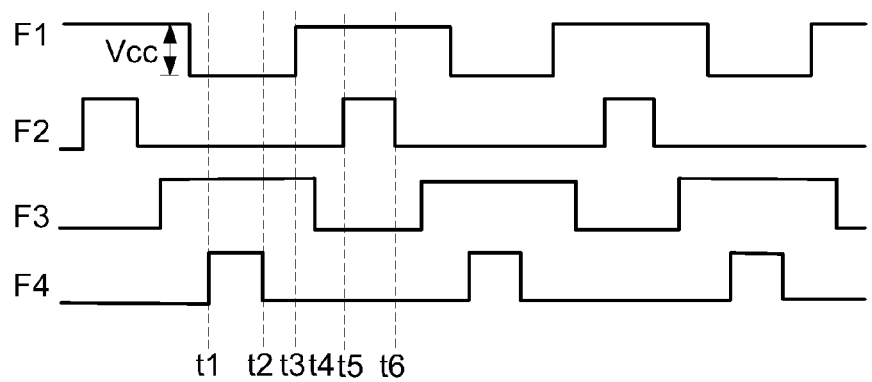
FIG. 1B (prior art) is a schematic timing waveform diagram illustrating the clocks for controlling the 4-phase charge pump circuit of FIG. 1A.

It is noted that the branch number of the boosting units is not restricted. For example, similar to the circuitry of FIG. 1A, the boosting stages of the boosting unit used in the charge pump system of the present invention are arranged in a single branch. Moreover, the number of boosting states in the boosting unit is not restricted. For example, a single boosting stage and a single control stage may be collaboratively defined as a boosting unit. Alternatively, plural boosting stages and a single control stage may be collaboratively defined as a boosting unit.

Figure 10A:
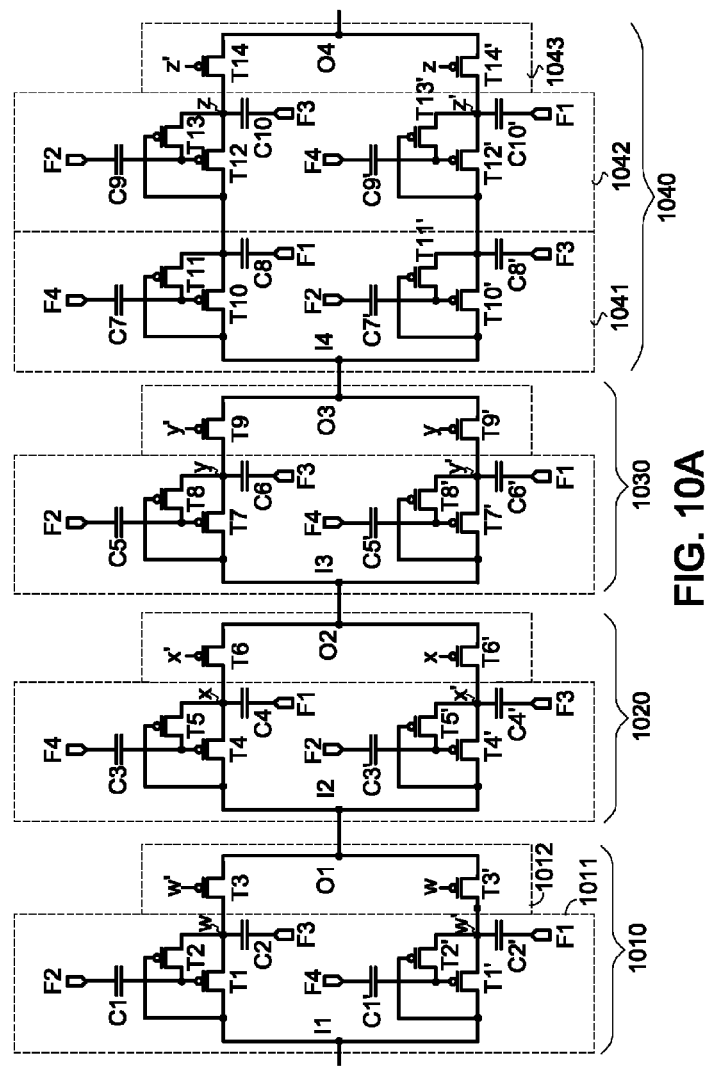
FIG. 10A schematically illustrates an exemplary boosting unit group used in the charge pump circuit of the charge pump system of the present invention.

FIG. 10A schematically illustrates an exemplary boosting unit group used in the charge pump circuit of the charge pump system of the present invention. The boosting unit group is composed of P-type transistors and capacitors. As shown in FIG. 10A, the boosting unit group comprises four boosting units 1010, 1020, 1030 and 1040. The first boosting unit 1010 comprises a boosting stage 1011 and a control stage 1012. Each of the second boosting unit 1020 and the third boosting unit 1030 comprises a boosting unit and a control stage. The fourth boosting unit 1040 comprises two boosting stages 1041, 1042 and a control stage 1043.

The boosting stages of the four boosting units 1010, 1020, 1030 and 1040 have the same structure. The control stages of the four boosting units 1010, 1020, 1030 and 1040 have the same structure. Moreover, the boosting circuits of all boosting stages have the same structure, and the control circuits of all control stages have the same structure.

In the first branch, the first boosting circuit of the first boosting unit 1010 comprises a precharge transistor T2, a main transistor T1, and two capacitors C1, C2. Both of the precharge transistor T1 and the main transistor T2 are P-type transistors. The source terminal of the main transistor T1 is served as the input terminal I1 of the first boosting circuit. The drain terminal of the main transistor T1 is served as the output terminal w of the first boosting circuit. The second clock F2 is transmitted to the gate terminal of the main transistor T1 through the capacitor C1. The source terminal of the precharge transistor T2 is connected with the gate terminal of the main transistor T1. The drain terminal of the precharge transistor T2 is connected with the output terminal w of the first boosting circuit. The gate terminal of the precharge transistor T2 is connected with the input terminal I1 of the first boosting circuit. Moreover, the second clock F3 is transmitted to the output terminal of the first boosting stage through the capacitor C2.

Moreover, in the control stage 1012, the first control circuit comprises a transistor T3, and the second control circuit comprises a transistor T3'. Both of the transistors T3 and T3' are P-type transistors. The source terminal of the transistor T3 is connected with the output terminal w of the first boosting circuit. The drain terminal of the transistor T3 is connected with the output terminal O1 of the first boosting unit 1010. The gate terminal of the transistor T3 is connected with the output terminal w' of the second boosting circuit. The source terminal of the transistor T3' is connected with the output terminal w' of the second boosting circuit. The drain terminal of the transistor T3' is connected with the output terminal O1 of the first boosting unit 1010. The gate terminal of the transistor T3' is connected with the output terminal w of the first boosting circuit.

Figure 10B:
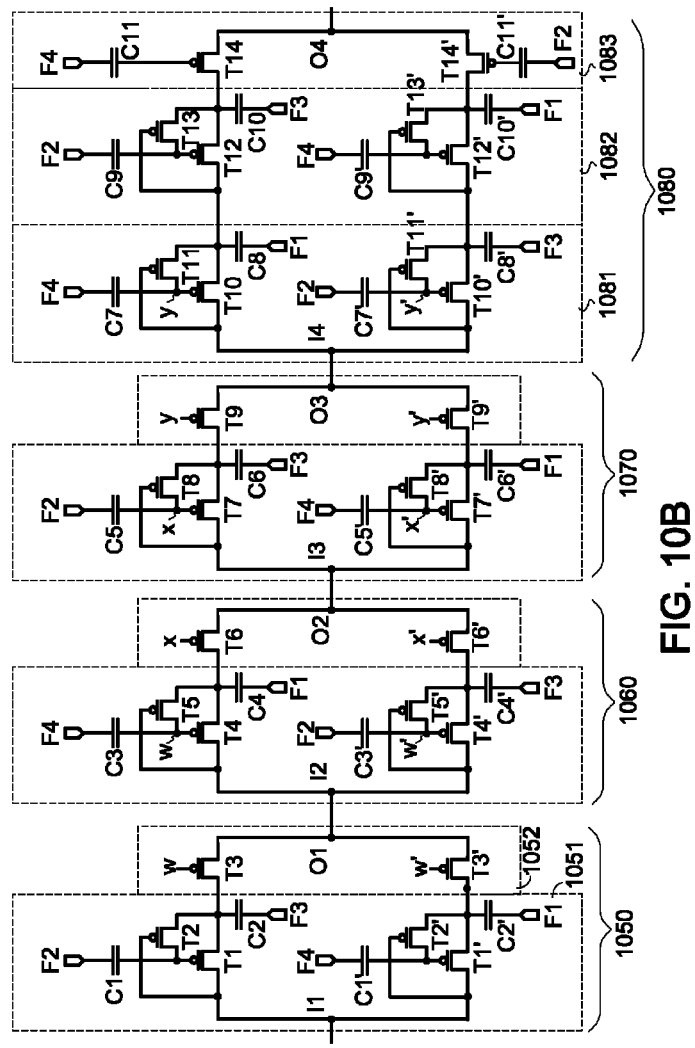
FIG. 10B schematically illustrates another exemplary boosting unit group used in the charge pump circuit of the charge pump system of the present invention.

FIG. 10B schematically illustrates another exemplary boosting unit group used in the charge pump circuit of the charge pump system of the present invention. The boosting unit group is composed of P-type transistors and capacitors. As shown in FIG. 10B, the boosting unit group comprises four boosting units 1050, 1060, 1070 and 1080. The first boosting unit 1050 comprises a boosting stage 1051 and a control stage 1052. Each of the second boosting unit 1060 and the third boosting unit 1070 comprises a boosting unit and a control stage. The fourth boosting unit 1080 comprises two boosting stages 1081, 1082 and a control stage 1083.

In comparison with the boosting unit group of FIG. 10A, the structure of the control stage in the boosting unit group of FIG. 10B is distinguished. The other components are similar to those of the boosting unit group of FIG. 10A, and are not redundantly described herein. For example, in the control stage 1052 of the first boosting unit 1050, the first control circuit comprises a transistor T3, and the second control circuit comprises a transistor T3'. Both of the transistors T3 and T3' are P-type transistors. The source terminal of the transistor T3 is connected with the output terminal of the first boosting circuit. The drain terminal of the transistor T3 is connected with the output terminal O1 of the first boosting unit 1050. The gate terminal of the transistor T3 is connected with the gate terminal w of the main transistor of the first boosting circuit of the second boosting unit 1060. The source terminal of the transistor T3' is connected with the output terminal of the second boosting circuit. The drain terminal of the transistor T3' is connected with the output terminal O1 of the first boosting unit 1050. The gate terminal of the transistor T3' is connected with the gate terminal w' of the main transistor of the second boosting circuit of the second boosting unit 1060.

Please refer to FIG. 10B again. In the control stage 1083 of the of the fourth boosting unit 1080, the first control circuit comprises a P-type transistor T14 and a capacitor C11, and the second control circuit comprises a P-type transistor T14' and a capacitor C11'. The source terminal of the transistor T14 is connected with the output terminal of the first boosting circuit. The drain terminal of the transistor T14 is connected with the output terminal O4 of the fourth boosting unit 1080. Moreover, the fourth clock F4 is transmitted to the gate terminal of the transistor T14 through the capacitor C11. The source terminal of the transistor T14' is connected with the output terminal of the second boosting circuit. Moreover, the second clock F2 is transmitted to the gate terminal of the transistor T14' through the capacitor C11'.

FIG. 10C is a schematic timing waveform diagram illustrating the clocks for controlling the boosting unit group of FIG. 10A or FIG. 10B. FIG. 10D is a schematic circuit block diagram illustrating the increased voltage by the boosting units of the first exemplary charge pump circuit of the FIG. 5. The increased voltage for each of the first boosting stage, the second boosting stage and the third boosting stage is $\Delta V$, and the increased voltage for the fourth boosting voltage is $2\Delta V$, wherein $\Delta V$ is the amplitude of each of the clocks F1~F4.

FIG. 10E is a table showing the relationship between the operating voltage, the number control signal and the output voltage for the charge pump circuit of FIG. 10D. If both of the operating voltage V1 and the increased voltage $\Delta V$ are 1.6V, the number control signal Ctrl is set as 4, so that the output voltage Vout of the charge pump circuit is 9.6V. If both of the operating voltage V1 and the increased voltage $\Delta V$ are 2.0V, the number control signal Ctrl is set as 3, so that the output voltage Vout of the charge pump circuit is 10V. If both of the operating voltage V1 and the increased voltage $\Delta V$ are 2.5V, the number control signal Ctrl is set as 2, so that the output voltage Vout of the charge pump circuit is 10V. If both of the operating voltage V1 and the increased voltage $\Delta V$ are 3.3V, the number control signal Ctrl is set as 1, so that the output voltage Vout of the charge pump circuit is 9.9V. After an output voltage Vout is transmitted to the voltage regulator 440, the output voltage Vout is regulated to a more stable regulated voltage Vpp (e.g. 10V) by the voltage regulator 440.

Figure 11A:
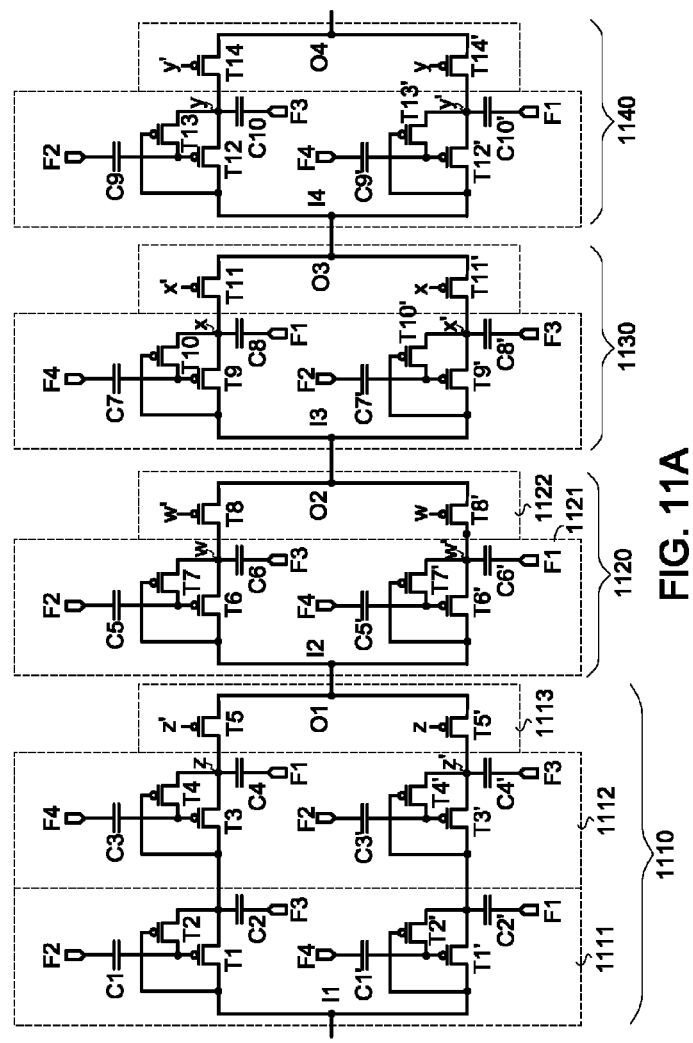
FIG. 11A schematically illustrates another exemplary boosting unit group used in the charge pump circuit of the charge pump system of the present invention. The boosting unit group is composed of P-type transistors and capacitors.

FIG. 11A schematically illustrates another exemplary boosting unit group used in the charge pump circuit of the charge pump system of the present invention. The boosting unit group is composed of P-type transistors and capacitors. As shown in FIG. 11A, the boosting unit group comprises four boosting units 1110, 1120, 1130 and 1140. The first boosting unit 1110 comprises two boosting stages 1111, 1112 and a control stage 1113. The second boosting unit 1120 comprises a boosting stage 1121 and a control stage 1122. Each of the third boosting unit 1130 and the fourth boosting unit 1140 comprises a boosting unit and a control stage.

The boosting stages of the four boosting units 1110, 1120, 1130 and 1140 have the same structure. The control stages of the four boosting units 1110, 1120, 1130 and 1140 have the same structure. Moreover, the boosting circuits of all boosting stages have the same structure, and the control circuits of all control stages have the same structure. In comparison with the boosting unit group of FIG. 10A, the arrangements of the boosting units of the boosting unit group of FIG. 11A are distinguished. The connection between the boosting units of the boosting unit group will not be redundantly described herein.

Figure 11B:
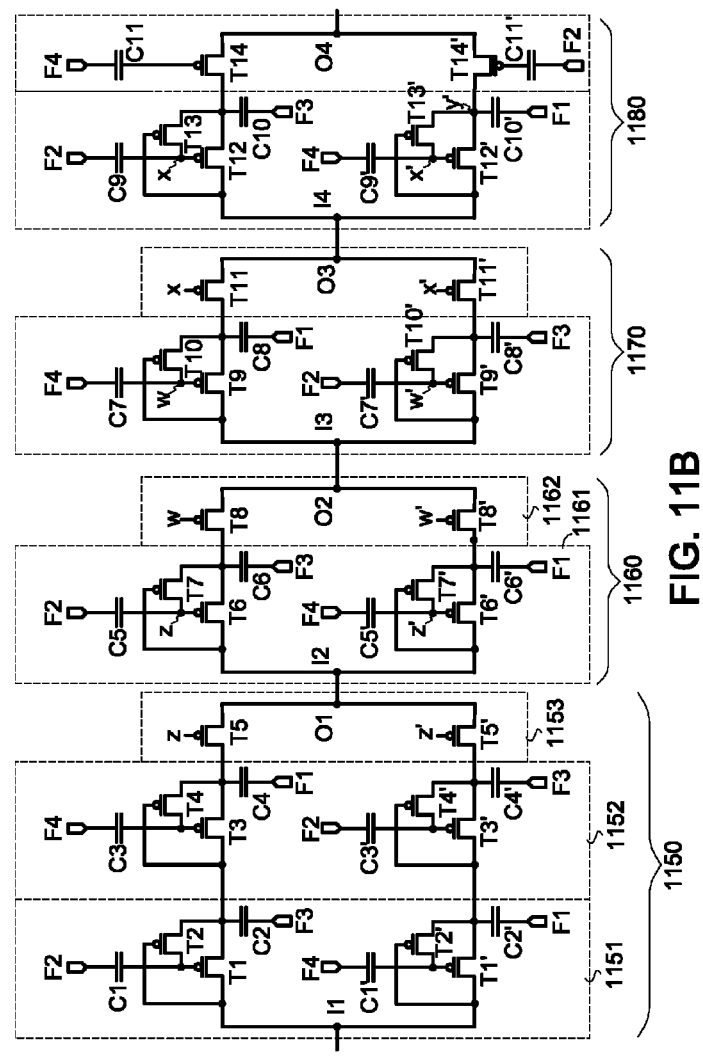
FIG. 11B schematically illustrates another exemplary boosting unit group used in the charge pump circuit of the charge pump system of the present invention. The boosting unit group is composed of P-type transistors and capacitors.

FIG. 11B schematically illustrates another exemplary boosting unit group used in the charge pump circuit of the charge pump system of the present invention. The boosting unit group is composed of P-type transistors and capacitors. As shown in FIG. 11B, the boosting unit group comprises four boosting units 1150, 1160, 1170 and 1180. The first boosting unit 1150 comprises two boosting stages 1151, 1152 and a control stage 1153. The second boosting unit 1160 comprises a boosting stage 1161 and a control stage 1162. Each of the third boosting unit 1170 and the fourth boosting unit 1180 comprises a boosting unit and a control stage.

The boosting stages of the four boosting units 1150, 1160, 1170 and 1180 have the same structure. The control stages of the four boosting units 1150, 1160, 1170 and 1180 have the same structure. Moreover, the boosting circuits of all boosting stages have the same structure, and the control circuits of all control stages have the same structure. In comparison with the boosting unit group of FIG. 10B, the arrangements of the boosting units of the boosting unit group of FIG. 11B are distinguished. The connection between the boosting units of the boosting unit group will not be redundantly described herein.

FIG. 11C is a schematic timing waveform diagram illustrating the clocks for controlling the boosting unit group of FIG. 11A or FIG. 11B. FIG. 11D is a schematic circuit block diagram illustrating the increased voltage by the boosting units of the second exemplary charge pump circuit of the FIG. 7. The increased voltage for the first boosting stage is $2\Delta V$, and the increased voltage for each of the second boosting stage, the third boosting stage is $\Delta V$, wherein $\Delta V$ is the amplitude of each of the clocks F1~F4.

FIG. 11E is a table showing the relationship between the operating voltage, the number control signal and the output voltage for the charge pump circuit of FIG. 11D. If both of the operating voltage V1 and the increased voltage $\Delta V$ are 1.6V, the number control signal Ctrl is set as 4, so that the output voltage Vout of the charge pump circuit is 9.6V. If both of the operating voltage V1 and the increased voltage $\Delta V$ are 2.0V, the number control signal Ctrl is set as 3, so that the output voltage Vout of the charge pump circuit is 10V. If both of the operating voltage V1 and the increased voltage $\Delta V$ are 2.5V, the number control signal Ctrl is set as 2, so that the output voltage Vout of the charge pump circuit is 10V. If both of the operating voltage V1 and the increased voltage $\Delta V$ are 3.3V, the number control signal Ctrl is set as 1, so that the output voltage Vout of the charge pump circuit is 9.9V. After an output voltage Vout is transmitted to the voltage regulator 440, the output voltage Vout is regulated to a more stable regulated voltage Vpp (e.g. 10V) by the voltage regulator 440.

Figure 2A:
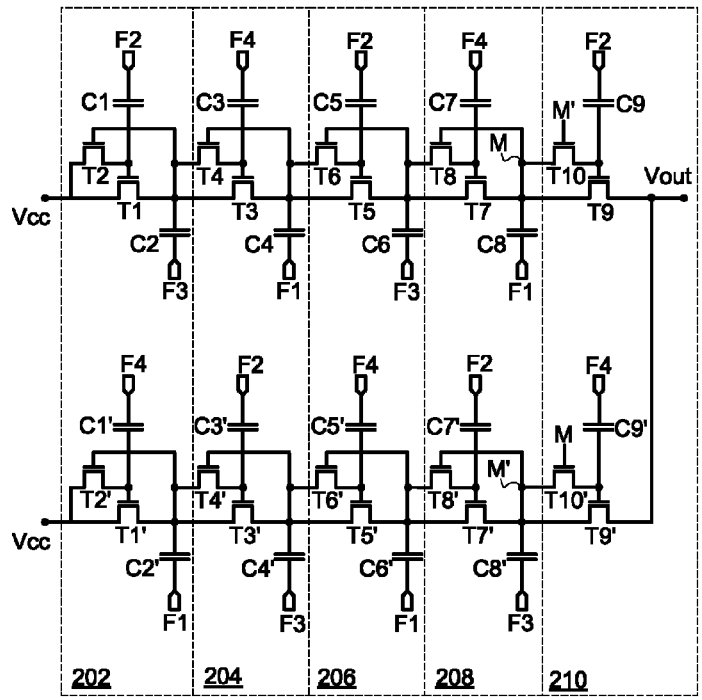
FIG. 2A (prior art) schematically illustrates a conventional 4-phase dual-branch charge pump circuit for generating a positive voltage.
Figure 2B:
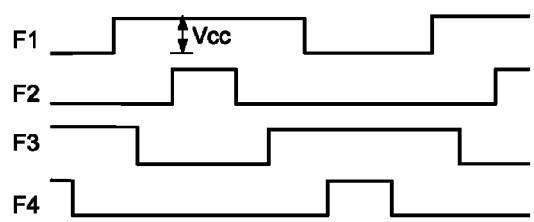
FIG. 2B (prior art) is a schematic timing waveform diagram illustrating the clocks for controlling the 4-phase dual-branch charge pump circuit of FIG. 2A.
Figure 3A:
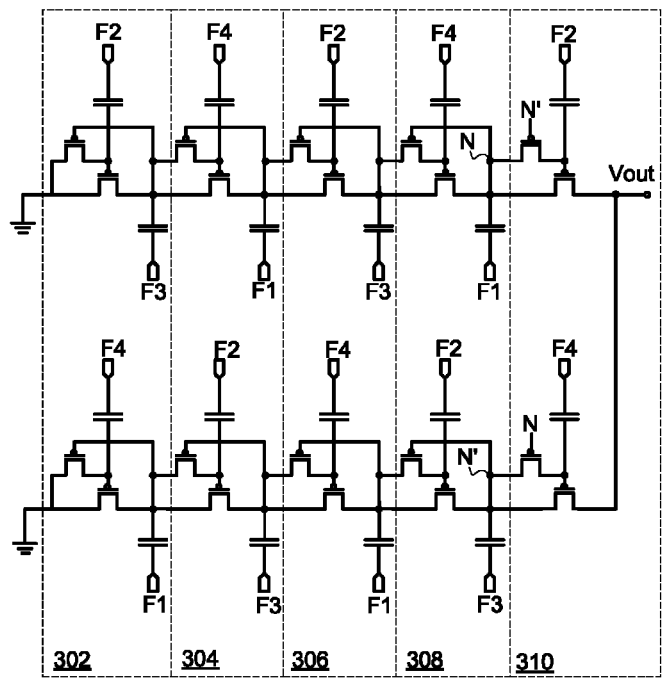
FIG. 3A (prior art) schematically illustrates a conventional 4-phase dual-branch charge pump circuit for generating a negative voltage.
Figure 3B:
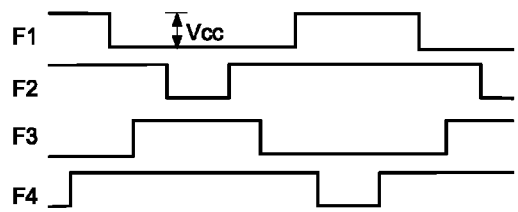
FIG. 3B (prior art) is a schematic timing waveform diagram illustrating the clocks for controlling the 4-phase dual-branch charge pump circuit of FIG. 3A.

It is noted that numerous modifications and alterations of the boosting unit may be made while retaining the teachings of the invention. For example, the boosting circuit composed of two N-type transistors and two capacitors as shown in FIG. 2A or the boosting circuit composed of two P-type transistors and two capacitors as shown in FIG. 3A may be applied to the boosting circuit of the present invention.

From the above descriptions, the present invention provides a charge pump system. In the charge pump system, the number of boosting units can be determined according to the relationship between the operating voltage and the preset output voltage. Consequently, the charge pump system of the present invention can be applied to various circuit systems at various operating voltages.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A charge pump system, comprising:
a clock generator for generating a clock group comprising a first clock, a second clock, a third clock and a fourth clock;
a boosting unit determination device for generating a number control signal;
a charge pump circuit for receiving an operating voltage, the number control signal and the clock group, and generating an output voltage, wherein the charge pump circuit comprises plural boosting units, wherein a first portion of the plural boosting units are controlled by the clock group according to the number control signal, and the operating voltage is converted into the output voltage by the first portion of the plural boosting units; and
a voltage regulator for receiving the output voltage and converting the output voltage into a specified regulated voltage;
wherein a first boosting unit of the plural boosting units comprises: a first capacitor; a second capacitor; a first P-type transistor, wherein the second clock is transmitted to a gate terminal of the first P-type transistor through the first capacitor, the third clock is transmitted to a drain terminal of the first P-type transistor through the second capacitor, and a source terminal of the first P-type transistor is connected with an input terminal of the first boosting unit; a second P-type transistor, wherein a gate terminal of the second P-type transistor is connected with the input terminal of the first boosting unit, a source terminal of the second P-type transistor is connected with the gate terminal of the first P-type transistor, and a drain terminal of the second P-type transistor is connected with the drain terminal of the first P-type transistor; and a third P-type transistor, wherein a source terminal of the third P-type transistor is connected with the drain terminal of the second P-type transistor, and a drain terminal of the third P-type transistor is connected with an output terminal of the first boosting unit;
wherein a second boosting unit of the plural boosting units comprises: a third capacitor; a fourth capacitor; a fourth P-type transistor, wherein the fourth clock is transmitted to a gate terminal of the fourth P-type transistor through the third capacitor, the first clock is transmitted to a drain terminal of the fourth P-type transistor through the fourth capacitor, and a source terminal of the fourth P-type transistor is connected with the output terminal of the first boosting unit; a fifth P-type transistor, wherein a gate terminal of the fifth P-type transistor is connected with the output terminal of the first boosting unit, a source terminal of the fifth P-type transistor is connected with the gate terminal of the fourth P-type transistor, and a drain terminal of the fifth P-type transistor is connected with the drain terminal of the fourth P-type transistor; and a sixth P-type transistor, wherein a source terminal of the sixth P-type transistor is connected with the drain terminal of the fifth P-type transistor, and a drain terminal of the sixth P-type transistor is connected with an output terminal of the second boosting unit; and
wherein a gate terminal of the third P-type transistor is connected with the gate terminal of the fourth P-type transistor.

2. The charge pump system as claimed in claim 1, wherein the clock group is not transmitted to a second portion of the plural boosting units according to the number control signal, so that the second portion of the plural boosting units are disabled.

3. The charge pump system as claimed in claim 1, wherein the boosting unit determination device comprises:
a reference voltage generator for generating a reference voltage; and
an operating voltage detector for receiving the reference voltage and the operating voltage to detect a magnitude of the operating voltage, and generating the number control signal according to a relationship between the operating voltage and a preset output voltage.

4. The charge pump system as claimed in claim 1, wherein the charge pump circuit comprises:
an input switching circuit for receiving the operating voltage and the number control signal;
a clock transfer circuit for receiving the number control signal and the clock group; and
the plural boosting units, wherein the operating voltage is inputted into an input terminal of a first boosting unit of the plural boosting units, the output voltage is outputted from a last boosting unit of the plural boosting units, and an input terminal of each of the other boosting units of the plural boosting units is connected with an output terminal of a previous boosting unit and the input switching circuit,
wherein if the number control signal is equal to N, the first portion of the plural boosting units comprise the last N boosting units of the plural boosting units, wherein the operating voltage is provided to a first one of the last N boosting units of the plural boosting units through the input switching circuit, and the clock group is transmitted to the last N boosting units of the plural boosting units through the clock transfer circuit, so that the last N boosting units of the plural boosting units are controlled by the clock group to convert the operating voltage into the output voltage.

5. The charge pump system as claimed in claim 1, wherein the charge pump circuit comprises:
an output switching circuit for receiving the number control signal;
a clock transfer circuit for receiving the number control signal and the clock group; and
the plural boosting units, wherein the operating voltage is inputted into an input terminal of a first boosting unit of the plural boosting units, an input terminal of each of the other boosting units of the plural boosting units is connected with an output terminal of a previous boosting unit, and the output terminals of the plural boosting units are connected with the output switching circuit,
wherein if the number control signal is equal to M, the first portion of the plural boosting units comprise the first M boosting units of the plural boosting units, wherein the clock group is transmitted to the first M boosting units of the plural boosting units through the clock transfer circuit, so that the first M boosting units of the plural boosting units are controlled by the clock group to generate the output voltage, wherein the output voltage is received by and outputted from the output switching circuit.

6. The charge pump system as claimed in claim 1, wherein a specified boosting unit of the plural boosting units comprises:
- a first boosting stage connected with an input terminal of the specified boosting unit;
- a second boosting stage connected with the first boosting stage; and
- a control stage connected between the second boosting stage and an output terminal of the specified boosting unit.

7. The charge pump system as claimed in claim 1, wherein a specified boosting unit of the plural boosting units comprises:
- a boosting stage connected with an input terminal of the specified boosting unit; and
- a control stage connected between the boosting stage and an output terminal of the specified boosting unit.

8. The charge pump system as claimed in claim 7, wherein said boosting stage comprises:
- a first boosting circuit connected with the input terminal of the specified boosting unit; and
- a second boosting circuit connected with the input terminal of the specified boosting unit,
- wherein the first boosting circuit is controlled by the second clock and the third clock, and the second boosting circuit is controlled by the fourth clock and the first clock.

9. The charge pump system as claimed in claim 8, wherein the control stage comprises:
- a first control circuit connected between the first boosting circuit and the output terminal of the specified boosting unit; and
- a second control circuit connected between the second boosting circuit and the output terminal of the specified boosting unit.

* * * * *